United States Patent
Perkins

(10) Patent No.: US 7,249,806 B1
(45) Date of Patent: Jul. 31, 2007

(54) HYDRAULIC MOTOR AND BRAKE CONTROL SYSTEM AND METHOD OF CONTROLLING THE SAME

(75) Inventor: Gerard T. Perkins, Hopkinsville, KY (US)

(73) Assignee: White Drive Products, Inc., Hopkinsville, KY (US)

(*) Notice: Subject to any disclaimer, the term of this patent is extended or adjusted under 35 U.S.C. 154(b) by 6 days.

(21) Appl. No.: 11/004,484

(22) Filed: Dec. 3, 2004

Related U.S. Application Data

(60) Provisional application No. 60/628,992, filed on Nov. 18, 2004, provisional application No. 60/573,291, filed on May 21, 2004.

(51) Int. Cl.
*B60T 13/18* (2006.01)
(52) U.S. Cl. .................. 303/11; 188/170; 180/306
(58) Field of Classification Search .......... 303/6.01, 303/11, 151, 139; 188/170; 180/305, 306, 180/307, 308
See application file for complete search history.

(56) References Cited

U.S. PATENT DOCUMENTS

| | | | |
|---|---|---|---|
| 4,317,331 A * | 3/1982 | Aruga et al. ................ 60/436 |
| 4,406,354 A * | 9/1983 | Barsted .................... 477/184 |
| 4,714,296 A | 12/1987 | Imoto et al. |
| 4,995,677 A | 2/1991 | Matsuda et al. |
| 5,251,442 A | 10/1993 | Roche |
| 5,531,071 A * | 7/1996 | Asano ...................... 60/441 |
| 5,709,282 A * | 1/1998 | Akira et al. .............. 180/307 |
| 6,050,091 A * | 4/2000 | Maruta ...................... 60/436 |
| 6,186,262 B1 * | 2/2001 | Mann et al. .............. 180/308 |
| 6,688,419 B2 * | 2/2004 | Eriksen et al. ............ 180/308 |
| 6,874,857 B2 * | 4/2005 | Tanabe .................... 303/11 |
| 2004/0020703 A1 * | 2/2004 | Ishimaru et al. .......... 180/307 |

* cited by examiner

*Primary Examiner*—Devon Kramer
(74) *Attorney, Agent, or Firm*—Waddey & Patterson, P.C.; Phillip E. Walker; Mark J. Patterson

(57) ABSTRACT

A hydraulic control system for operating at least one hydraulic motor and at least one hydraulic brake. In one specific embodiment of the invention, the hydraulic motor and brake are part of an industrial vehicle.

10 Claims, 5 Drawing Sheets

HYDRAULIC MOTOR AND BRAKE CONTROL SYSTEM AND METHOD OF CONTROLLING THE SAME

CROSS-REFERENCES TO RELATED APPLICATIONS

This application claims benefit of Provisional U.S. Patent Application Ser. No. 60/573,291 filed May 21, 2004, entitled "Hydraulic Motor & Brake Control Valve Circuit" and Provisional U.S. Patent Application Ser. No. 60/628,992 filed Nov. 18, 2004, entitled "Hydraulic Motor & Brake Control Valve Circuit Manifold", both of which are hereby incorporated by reference in their entirety.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

All patents or publications described or discussed herein are hereby incorporated by reference in their entirety.

BACKGROUND OF THE INVENTION

The present invention relates generally to hydraulic circuits for hydraulic motors and hydraulic brakes and to methods of controlling hydraulic motors and hydraulic brakes using a hydraulic circuit. More particularly, the present invention relates to a hydraulic circuit and method used to activate and deactivate hydraulic motors and hydraulic brakes, including hydraulic motors and brakes used on load carrying vehicles that must operate with precision on inclined surfaces.

Hydraulic motors and brakes are frequently used in industrial vehicles, including forklifts, scissor lifts, and mobile platforms. Although such industrial vehicles generally operate at low speeds, safety and other functional requirements dictate that they are capable of precision and stable operation, including on inclined surfaces. For example, a mobile platform vehicle must be capable of smooth transitions between stopping and starting, even on inclined surfaces, when supporting a worker on the extended platform. Accordingly, such vehicles will typically include a rechargeable electric power source, an electrically powered hydraulic fluid pump, a fluid tank, and one or more hydraulic motors coupled to the vehicle's drive wheels. Conventionally, hydraulic motors used on vehicles are combined with spring brakes that are normally engaged and are disengaged in response to a flow of hydraulic fluid that pressurizes the brake release mechanism.

Typically, hydraulic vehicles will employ a joystick to allow the user to control the starting, stopping, and directional movement of the vehicle. Accordingly, when the joystick is in the neutral position, the pump is off, the brakes are engaged, and the vehicle should remain in a stationary position. When the joystick is moved from its neutral position, the pump and motors are activated, and movement of the vehicle is generated in accordance with the position of the joystick.

All of the hydraulic components in such a system are interconnected in one or more hydraulic circuits that include valves, pressure sensors, and other components to control and direct the flow of hydraulic fluid as needed. A variety of different hydraulic circuits have been specifically designed to control hydraulic brakes and hydraulic motors used in industrial vehicles. The objective of such a circuit includes controlling the motors and brakes in a manner that provides precise, stable, and safe movement of the vehicle. Unfortunately, conventional hydraulic circuits have ranged from the effective but complicated to the ineffective. In particular, conventional hydraulic circuits have not been effective in counteracting and suppressing undesirable and unsafe movements of industrial vehicles inherently associated with hydraulic motors and brakes, and particularly associated use of the vehicle on an inclined surface.

For example, in most conventional systems, the hydraulic motor will be activated before the hydraulic brake is disengaged for the motor. In such case, the hydraulic motor begins to turn and drive into the hydraulic brake before the hydraulic brake is disengaged. This reduces the life of the brake and increases the wear and tear on the motor.

Additionally, most conventional systems fail to properly pressurize the hydraulic motor when the hydraulic motor is under a load. When these conventional systems experience a static load on the motor, the motor will freely turn and not support the load. Due to this fact, in these conventional systems a counterbalancing or counter braking measure must be used in order to maintain the load in a stationary position. Normally, the conventional systems are designed to engage the brake to the motor when the motor is operating at low speeds in order to support this load. Once again, this causes the motor to drive into the brake and reduces the useful life of the brake and the motor. Examples of instances where the support of the load is a problem in conventional systems include the suspension of a weight or the retardation of a vehicle on an incline. Attempts in the prior art to inhibit vehicle "runaway" on an inclined surface have not been satisfactory because of their complexity and/or inability to prevent chugging or surging movement of the vehicle as the motor and brake start and stop the vehicle in rapid succession.

Conventional hydraulic motors and related circuits also experience pressure variances that adversely affect the operation of the hydraulic motor and vehicle. Various types of pressure variations are present in most hydraulic motors and the conventional hydraulic systems that control those motors. For example, some of the pressure variances are commonly referred to as cogging, pulsing, or surging of the motor. These pressure variances greatly reduce the control of the motor, especially at low speeds, reduce the efficiency of the motor, and reduce the useful life of the motor. Of course, pulsing or surging of the motor can be unsafe for the operator if the cogging or pulsing translates to movement of the vehicle itself.

What is needed, then, is a hydraulic control circuit and method for efficiently and safely controlling a hydraulic brake and hydraulic motor. In particular, a hydraulic motor and brake control circuit is needed to effectively eliminate vehicle runaway, undesirable vehicle movements caused by pressure variations in the motor, and to event the motor from driving into the brake.

BRIEF SUMMARY OF THE INVENTION

The present invention is a hydraulic control system for operating at least one hydraulic motor and at least one hydraulic brake. In one specific embodiment of the invention, the hydraulic motor and brake are part of an industrial vehicle.

Thus, in one embodiment, the hydraulic control circuit comprises a pump, a reservoir tank, a directional control valve, and a plurality of valves fluidly positioned to control the flow of hydraulic fluid between the pump, hydraulic motor, and reservoir tank. A first valve, or low limit valve, is fluidly positioned to restrict fluid flow from the brake to the reservoir tank after an initial pressure is reached. A second valve, or one-way valve, is fluidly positioned to restrict hydraulic flow from the brake to the pump. Additionally, a third valve is positioned to maintain a predetermined level of hydraulic pressure within the motor. The first and second valves are configured to allow fluid to flow from the pump to the brake and restrict fluid flow from the brake after the initial pressure is reached, wherein the initial pressure is less than a brake deactivation pressure. As such, once the hydraulic brake is deactivated, it will remain deactivated until the system pressure with the hydraulic drive system drops down to the initial pressure level.

The hydraulic control circuit can further comprise a second hydraulic sub-circuit connecting the fluid output on the motor to the tank. The second hydraulic sub-circuit can include a return valve connected between the fluid output on the motor and the tank and include a return valve control input. The return valve control input can be connected to the first hydraulic sub-circuit to receive a return valve control signal having a magnitude that is proportional to the motor input pressure.

Additionally, the second hydraulic sub-circuit can comprise a bypass return valve, and first, second and third restriction valves. The bypass return valve can be connected between the fluid output on the motor and the tank. The bypass return valve can be fluidly parallel to the return valve, wherein the bypass return valve maintains a minimum fluid flow independent of the operation of the return valve. The first restriction valve can be positioned along the return valve control input to control the return valve control signal and can limit the magnitude of the return valve control signal.

Additionally, the return valve can comprise a closing input connected to the second hydraulic sub-circuit to receive a closing signal. The second and third restriction valves can be positioned along the closing input to control the closing signal, wherein the second restriction valve is preferably fluidly parallel to the third restriction valve.

In an alternate embodiment, the hydraulic control circuit comprises a pump, a reservoir tank, a directional control valve, and at least three other valves fluidly positioned to control the flow of hydraulic fluid between the pump, hydraulic motor, and reservoir tank. A first valve is fluidly positioned to allow hydraulic flow to the motor until a first hydraulic pressure is reached. A second valve is fluidly positioned to restrict hydraulic flow to the motor until a second hydraulic pressure is reached. Additionally, a third valve is positioned to maintain a predetermined level of hydraulic pressure within the motor. The first valve is a low limit valve while the second valve is a high limit valve and both the first and second valves are positioned fluidly parallel to one another such that hydraulic flow passing through one valve does not pass through the other valve.

Additionally, this embodiment of the hydraulic control system comprises an open hydraulic path supplying hydraulic fluid to the hydraulic brake. The open hydraulic path is independent of the motor hydraulic path which supplies hydraulic fluid to the motor. Preferably, this independent path is such that the hydraulic fluid that deactivates the hydraulic brake does not engage the hydraulic motor on any single activation of the pump. Preferably, the open hydraulic path to the brake does not include additional valves or hydraulic flow controls in order to activate the hydraulic brakes and to release the brakes from engagement with the motors.

The invention includes a method of using a single pump to control the operation of at least one hydraulic motor and at least one hydraulic brake is included. The method comprises positioning the motor and the brake in separate hydraulic fluid lines and restricting the flow of hydraulic fluid to the motor until the hydraulic brake disengages.

The invention further includes a hydraulic drive system for operating a wheeled vehicle. The hydraulic drive system comprises a hydraulic motor operably connected to at least one vehicle wheel, a hydraulic pump, a first hydraulic sub-circuit connecting the pump to the motor, a hydraulic brake operably engaging the motor, and an open brake sub-circuit connecting the pump to the brake. The hydraulic motor includes a fluid input and a fluid output and is operable at a motor activation pressure, while the hydraulic brake is operable at a brake deactivation pressure.

In this embodiment, the first hydraulic sub-circuit provides a motor input pressure at the fluid input on the motor and further comprises a high limit valve and a low limit valve. The high limit valve is connected between the pump and the motor, while the low limit valve is connected fluidly parallel to the high limit valve and is positioned between the pump and the motor. The low limit valve restricts fluid flow to the motor after an initial pressure is reached and the high limit valve restricts fluid flow to the motor until the brake deactivation pressure is reached, wherein the initial pressure is less than the brake deactivation pressure. As such, operation of the hydraulic drive system restricts the rotation of the motor until the brake is operably disengaged from the motor.

Preferably, the motor activation pressure is greater than the initial pressure and less than the brake deactivation pressure. Additionally, in this embodiment the low limit valve and the high limit valve restrict fluid flow to the motor when the fluid pressure is between the brake deactivation pressure and the initial pressure.

This hydraulic drive system can further comprise a second hydraulic sub-circuit connecting the fluid output on the motor to the tank. The second hydraulic sub-circuit can include a return valve connected between the fluid output on the motor and the tank and include a return valve control input. The return valve control input can be connected to the first hydraulic sub-circuit to receive a return valve control signal having a magnitude that is proportional to the motor input pressure.

The return valve can be responsive to the return valve control signal to restrict fluid flow from the fluid output on the motor when the motor input pressure is below a set pressure level. Also, the return valve can enable unrestricted fluid flow from the fluid output on the motor when the motor input pressure is above the set pressure level. The set pressure level can be selected such that the return valve will maintain a positive pressure at the fluid input on the motor that is sufficient to inhibit free rotation of the motor and vehicle wheel when the vehicle is being operated on an inclined surface. Additionally, the set pressure level can be selected such that the return valve will maintain a positive pressure at the fluid input on the motor that is sufficient dampen variations in the motor input pressure.

Also included is a method of controlling fluid flow in a hydraulic circuit between a pump, hydraulic brake and a hydraulic motor, wherein the hydraulic circuit drives a wheeled vehicle. The method comprises the steps of restricting the fluid flow from the pump to the motor after an initial pressure is reached and allowing fluid flow from the pump to the motor after a motor activation pressure is reached. The method can include allowing fluid flow from the pump to the motor after a brake deactivation pressure is reached, wherein the brake deactivation pressure is greater than the motor activation pressure. The method can further comprise the steps of allowing unrestricted fluid flow from the pump to the brake at all pressures and placing the brake and motor in independent hydraulic sub-circuits.

Additionally, a method of dampening pressure variances of a hydraulic motor having a load when the motor is being operated at low speeds is included. The method comprises the steps of sensing when a motor input pressure at a fluid input on the motor drops below a predetermined pressure level, wherein the predetermined pressure level selected to indicate a minimum motor speed. Additionally, the method comprises restricting flow of hydraulic fluid from a drain on the motor when the motor input pressure drops below the predetermined pressure level and allowing unrestricted flow of hydraulic fluid from the motor drain when the motor input pressure is above the predetermined pressure level. The method can further include selecting the predetermined pressure level such that free rotation of the motor is inhibited when a load is applied to the motor. The method of can include maintaining a minimum flow of fluid from the motor drain when the motor is operated.

It is therefore a general object of the present invention to provide a hydraulic control circuit and system used to control the operation of a hydraulic brake and a hydraulic motor.

Another object of the present invention is to use a hydraulic control circuit that restricts flow of hydraulic fluid to a motor until a brake engaging that motor has been disengaged.

Still another object of the present invention is to provide a hydraulic control circuit including hydraulic valves fluidly positioned in parallel to control the flow of hydraulic fluid to a hydraulic motor to keep that motor from driving into a hydraulic brake.

Yet another object of the present invention is to provide a hydraulic control system having at least one valve used to control the flow of hydraulic fluid out of a motor in order to maintain pressure in the motor.

Another object of the present invention is to provide a hydraulic control system controlling the flow of hydraulic fluid out of a motor in order to maintain a predetermined pressure level pressure in the motor to maintain a load on the motor in a substantially static position.

Yet still another object of the present invention is to provide a hydraulic control system comprising a plurality of valves that controls the flow into and out of a hydraulic motor in order to control the movement of the motor, keep the motor from driving into a hydraulic brake, to maintain a load connected to the motor, and reduce pressure variances in the motor.

Another object of the present invention is to provide a hydraulic control system that reduces pressure variances in a hydraulic motor.

Yet another of the present invention is to provide a hydraulic control system that restricts fluid flow from a hydraulic brake to keep the brake disengaged during operation of a hydraulic motor engaging the brake.

Still another object of the present invention is to provide a hydraulic control system controlling the flow of hydraulic fluid out of a motor in order to maintain a minimum fluid flow from the motor to reduce operational variances of the motor.

Other and further objects features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

In FIG. 1 the pump is off and there is no hydraulic flow within the system and the valves are shown at their normal at-rest positions with the brakes applied.

FIG. 2 shows the positioning of the valves after the pump has been initially activated and is delivering fluid into the system. The low limit valve has reached its pressure level and has switched to a closed position thereby sending the hydraulic fluid substantially to the brakes.

In FIG. 3, the pump has continued to pressurize the system and provide the pressure needed to deactivate the brakes. Additionally, the pressure on the high limit valve has been reached thereby directing fluid to the motors.

In FIG. 4, the pump has been deactivated and the pressure within the system drops, causing the brakes to eventually re-engage and the hydraulic fluid to be returned to the reservoir tank.

FIG. 5 shows a one-way valve, a bypass return valve, and restrictive valve limiting the fluid flow of the system with the valves shown at their normal at-rest positions.

DETAILED DESCRIPTION OF THE INVENTION

Figure 1:
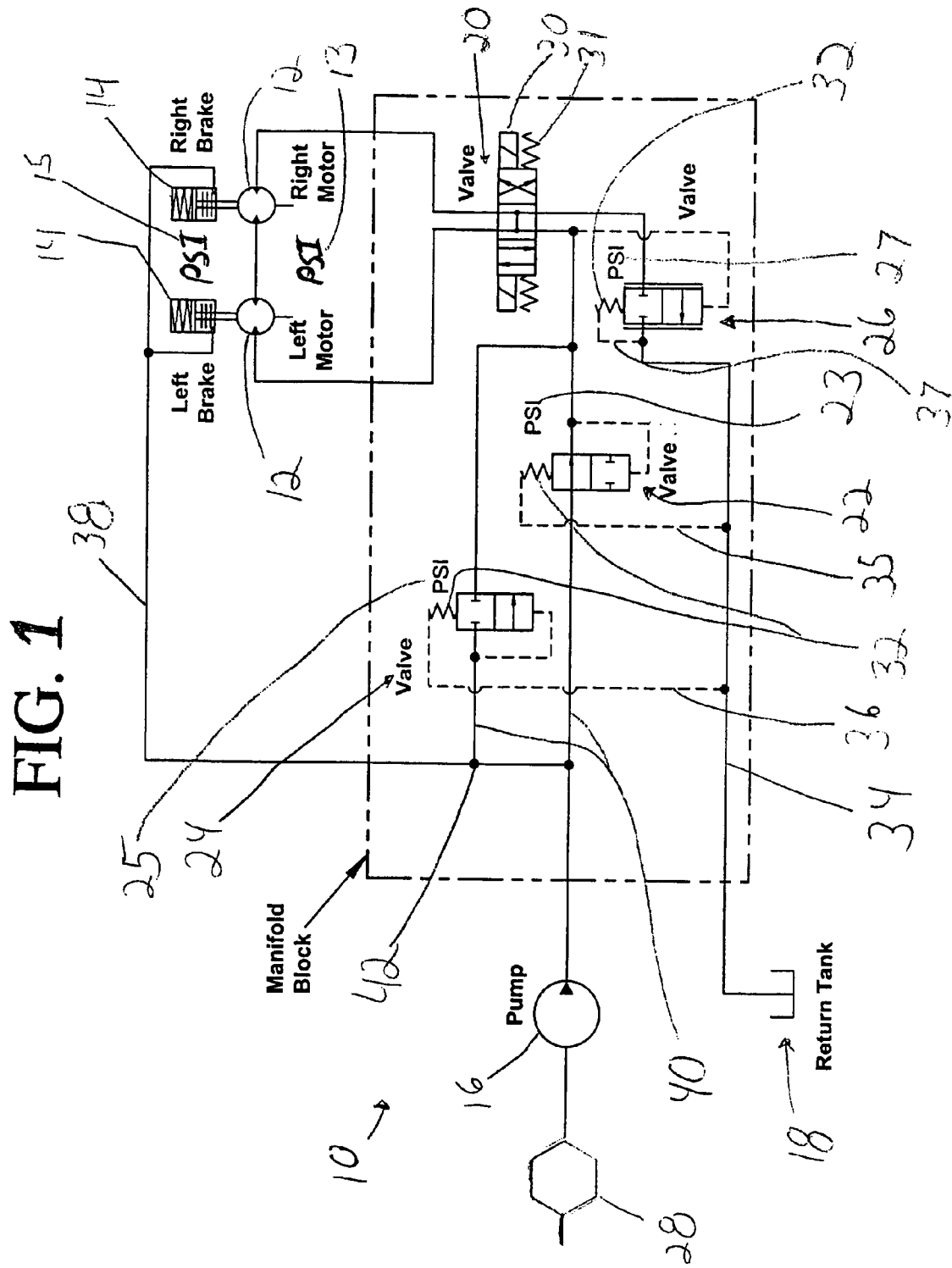
FIG. 1 is a schematic view of a first embodiment of a hydraulic control circuit and system in accordance with the present invention.
Figure 2:
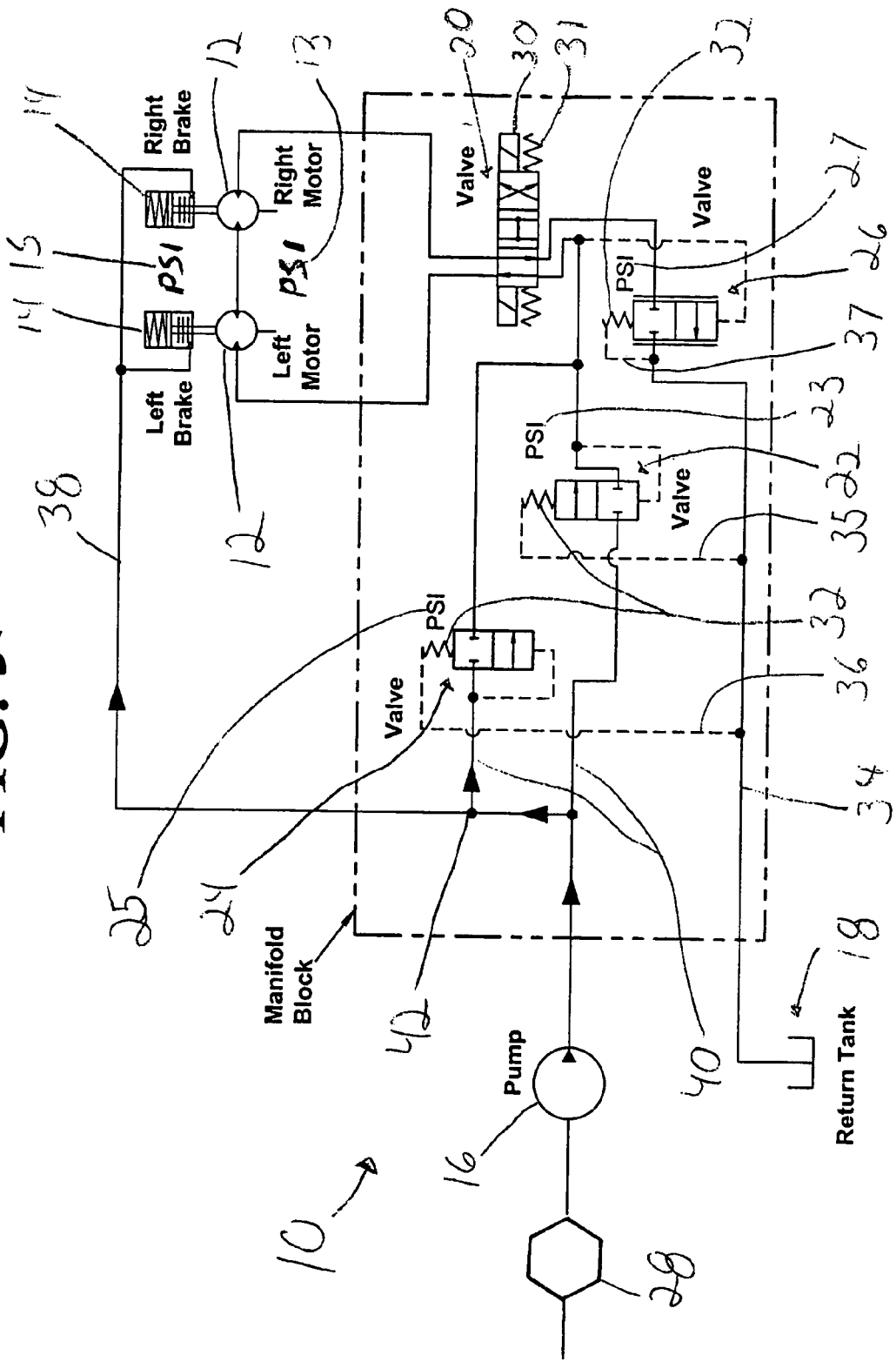
FIG. 2 is a schematic view of the circuit of FIG. 1.
Figure 3:
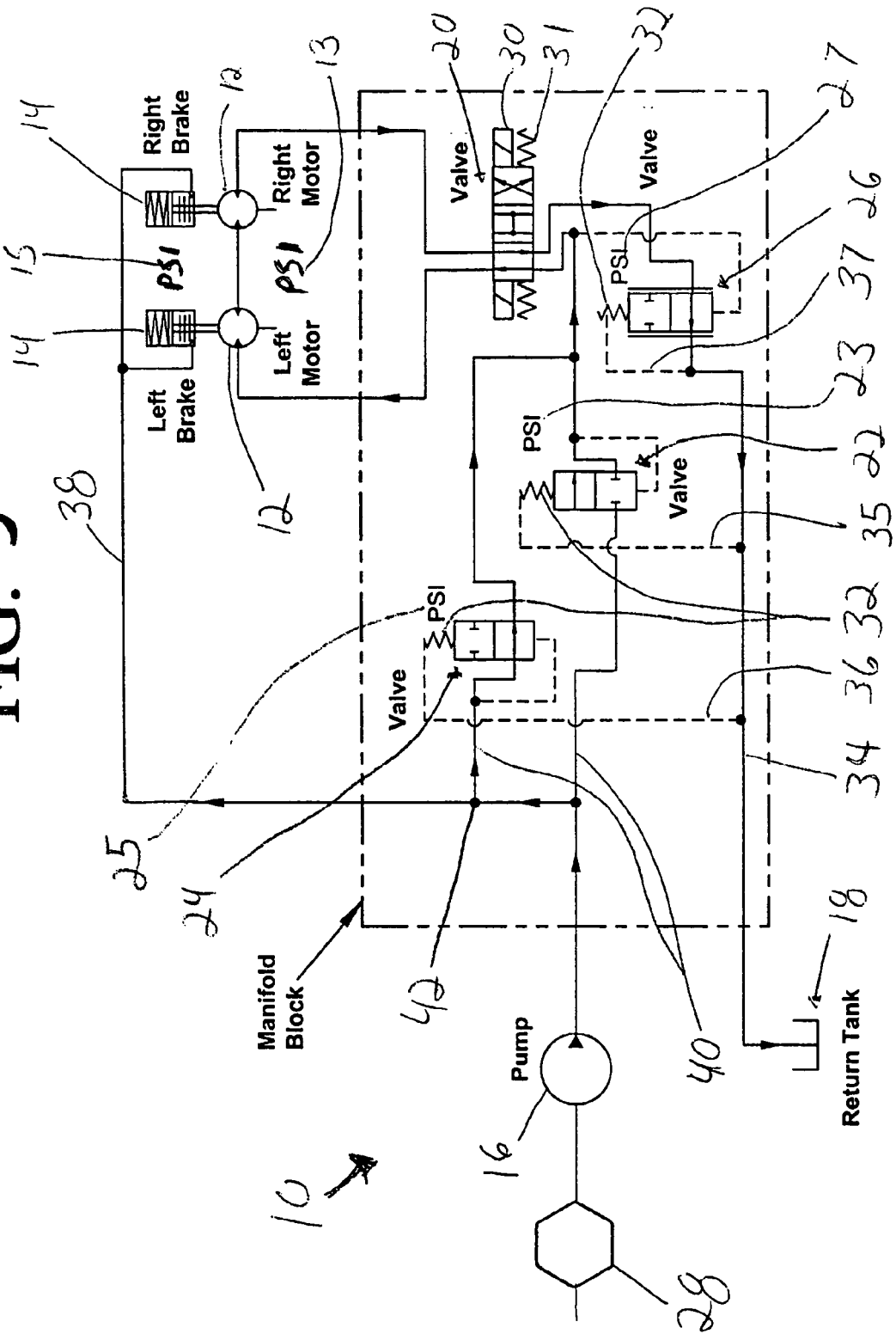
FIG. 3 is a schematic view of the circuit of FIGS. 1 and 2.
Figure 4:
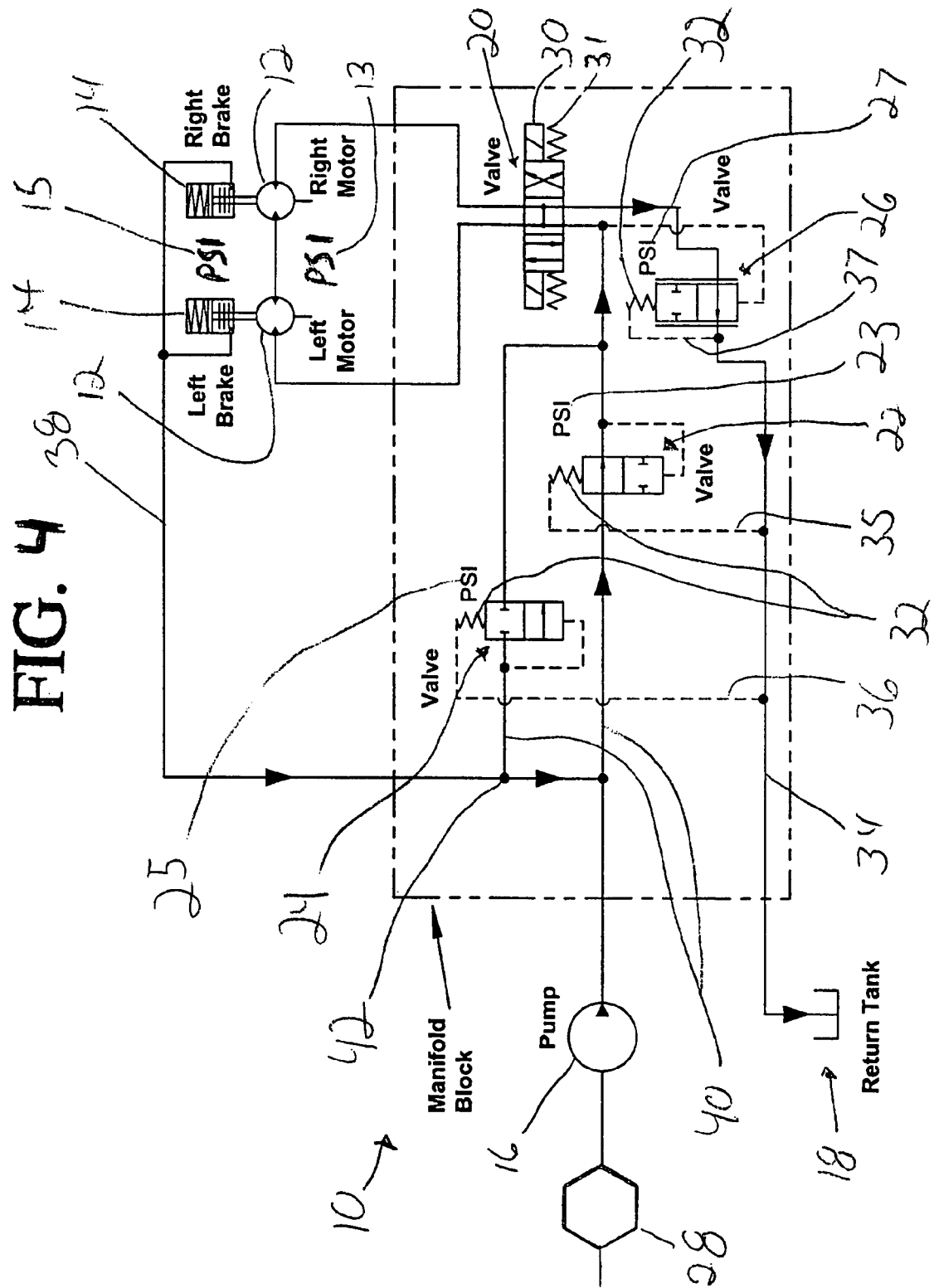
FIG. 4 is a schematic view of the circuit of FIGS. 1–3.

Referring now generally to FIGS. 1–4, a first embodiment of a hydraulic control system is schematically shown generally by the numeral 10. The hydraulic control system (10), which can also be described as a hydraulic control circuit, a hydraulic power system (10) or a hydraulic drive system (10), is for operating at least one hydraulic motor (12) and at least one hydraulic brake (14). The hydraulic control system (10) included a pump (16), a reservoir tank (18), a directional control valve (20), a first valve (22), a second valve (24), and a third valve (26).

The pump (16) is positioned to create hydraulic flow and hydraulic pressure within the hydraulic control system (10). The pump (16) receives control input from a user control device (28). The user control device (28) can be those devices known to activate and control the hydraulic flow and pressure from a pump (16). For example, the user control device (28) can include a lever, joy stick, knob, steering wheel, dial, button, pedal, and the like. The reservoir tank (18), which can also be described as a return tank (18) or a fluid holding container (18), is fluidly connected to the pump (16) in order to supply hydraulic fluid to the pump (16) and the hydraulic control system (10).

The directional control valve (20) is fluidly positioned between the hydraulic motor (12) and the pump (16) to control the direction of hydraulic flow through the hydraulic motor (12). Preferably the directional control valve (20) includes solenoids (30), springs (31), or a combination of both, that are responsive to the user control device (28) to facilitate the directional flow of the hydraulic fluid around the hydraulic motor (12) and through the hydraulic control system (10).

The first valve (22), which can also be described as a low limit valve (22), is fluidly positioned between the pump (16) and the hydraulic motor (12) to allow hydraulic flow to the hydraulic motor (12) until a first hydraulic pressure (23) is reached. The first valve (22) includes an initially open position and closes at the first hydraulic pressure (23). The first hydraulic pressure (23), which can also be described as an initial line pressure (23), can vary from application to application but is preferably high enough to initially pressurize the hydraulic control system (10). More preferably, the first hydraulic pressure (23) is less than the pressure needed to activate the hydraulic motor (12) and less than the pressure needed to deactivate the hydraulic brake (14).

The second valve (24), which can also be described as a high limit valve (24), is fluidly positioned between the pump (16) and the hydraulic motor (12). Additionally, the second valve (24) is positioned fluidly parallel to the first valve (22) and restricts hydraulic flow to the hydraulic motor (12) until a second hydraulic pressure (25) is reached. The second valve (24) is in normally closed position and opens at the second hydraulic pressure (25) to allow hydraulic flow to the motor (12).

The second hydraulic pressure (25), which can also be described as a motor flow pressure (25), can vary in amount from application to application but is greater than the first hydraulic pressure (23). Preferably the second hydraulic pressure (25) is greater than the pressure required to activate the hydraulic motor (12), which can be described as the motor activation pressure (13). Most preferably, the second hydraulic pressure (25) is also greater than the pressure required to disengage the hydraulic brake (14) from the hydraulic motor (12), which can be described as the brake disengagement pressure (15).

The third valve (26), which can also be described as a return valve (26), is fluidly positioned between the hydraulic motor (12) and the reservoir tank (18) to control the hydraulic flow to the reservoir tank (18). The third valve (26) includes an initially closed position and opens at a third hydraulic pressure (27).

The third hydraulic pressure (27) is responsive to a motor input pressure where the motor input pressure is established, or sensed, between the motor (12) and the pump (16). The third hydraulic pressure (27) can vary according to the application of the hydraulic control system (10). However, in a preferred embodiment, the third hydraulic pressure is a pressure sufficient enough to maintain a static load placed on the hydraulic motor (12). In a more preferred embodiment, the third hydraulic pressure (27) is greater than the first hydraulic pressure (23) but less than the second hydraulic pressure (25). Additionally, in a most preferred embodiment the third hydraulic pressure (27) is also less than the pressure required to disengage the hydraulic brake (14) from the hydraulic motor (12) and is less than the pressure required to activate the hydraulic motor (12).

The third valve (26) restricts hydraulic flow to the reservoir tank (18) before the third hydraulic pressure (27) is reached. When the hydraulic pressure within the hydraulic control system (10) is below the return pressure (27), hydraulic flow will not pass through the third valve (26). As such, third valve (26) restricts the hydraulic flow from the hydraulic motor (12) to the return tank (18) until the third hydraulic pressure (27) is reached.

The second valve (24) can also be described as being positioned to restrict hydraulic flow to the hydraulic motor (12) until the motor flow pressure (25) is reached within the hydraulic control system (10). Additionally, the second valve (24) is positioned to restrict hydraulic flow to the hydraulic motor (12) until the motor activation pressure (13) is reached within the hydraulic control system (10). The second valve (24) will prevent the hydraulic motor (12) from turning, or driving, into the hydraulic brake (14) because the motor activation pressure (13) is greater than the brake disengagement pressure (15). Therefore, the hydraulic brake (14) will release from the hydraulic motor (12) before fluid reaches the hydraulic motor (12) to activate the hydraulic motor (12).

The motor activation pressure (13), brake disengagement pressure (15), and motor flow pressure (25) can vary from application to application. However, preferably the motor flow pressure (25) is greater than both the motor activation pressure (13) and the brake disengagement pressure (15). Additionally, the motor activation pressure (13) is less than the brake disengagement pressure (15) which is less than the motor flow pressure (25).

Preferably the first, second, and third valves (22, 24 and 26) include mechanical devices (32) used to position or bias those valves in their initial operating positions. Preferably these mechanical devices are springs, but can be solenoids or other devices known to operate in a similar manner. Additionally, the first, second, and third valves (22, 24, and 26) are connected to the hydraulic return line (34) through external drains (35, 36, and 37 respectively). These external drains allow the spring cavity associated with the springs (32) to be biased to the atmospheric pressure.

The hydraulic control system (10) also includes an open hydraulic path (38), which can also be described as a first hydraulic flow path (38), fluidly connecting the pump (16) to the hydraulic brake (14). Additionally, a second hydraulic flow path (40), which can also be described as a motor hydraulic path (40), fluidly connects the pump (16) and the hydraulic motor (12). The first and second hydraulic flow paths (38 and 40) are independent wherein the hydraulic flow within these first and second hydraulic flow paths (38 and 40) do not interact during an individual activation of the pump (16). Consequently, there exists a separation point (42) such that when the pump (16) is activated, the hydraulic flow in the first hydraulic flow path (38) does not interact with the hydraulic flow in the second hydraulic flow path (40) while the pump (16) remains activated for that particular activation cycle. However, for that particular activation cycle once the pump (16) has been disengaged and is no longer generating hydraulic flow or hydraulic pressure, the hydraulic flow within the first and second hydraulic flow paths (38 and 40) is allowed to traverse the hydraulic lines of the hydraulic control system (10) and return to the reservoir tank (18).

Additionally, the first hydraulic flow path (38) is an open hydraulic path (38) such that the open hydraulic path (38) is not required to have other flow control devices, such as valves and the like, in order to properly regulate the operation of the hydraulic brake (14) in relation to the hydraulic motor (12) and other hydraulic components to which the hydraulic control system (10) may be connected.

Within the motor hydraulic path (40), the first valve (22) is fluidly in series with the directional control valve (20), the hydraulic motor (12), and the third valve (26). Additionally, the second valve (24) is fluidly in series with the directional control valve (20), hydraulic motor (12) and the third valve (26). However, the first valve (22) and second valve (24) are fluidly in parallel with one another such that when the pump is activated, hydraulic flow to the hydraulic motor (12) would have to either pass through the first valve (22) or the second valve (24).

Figure 5:
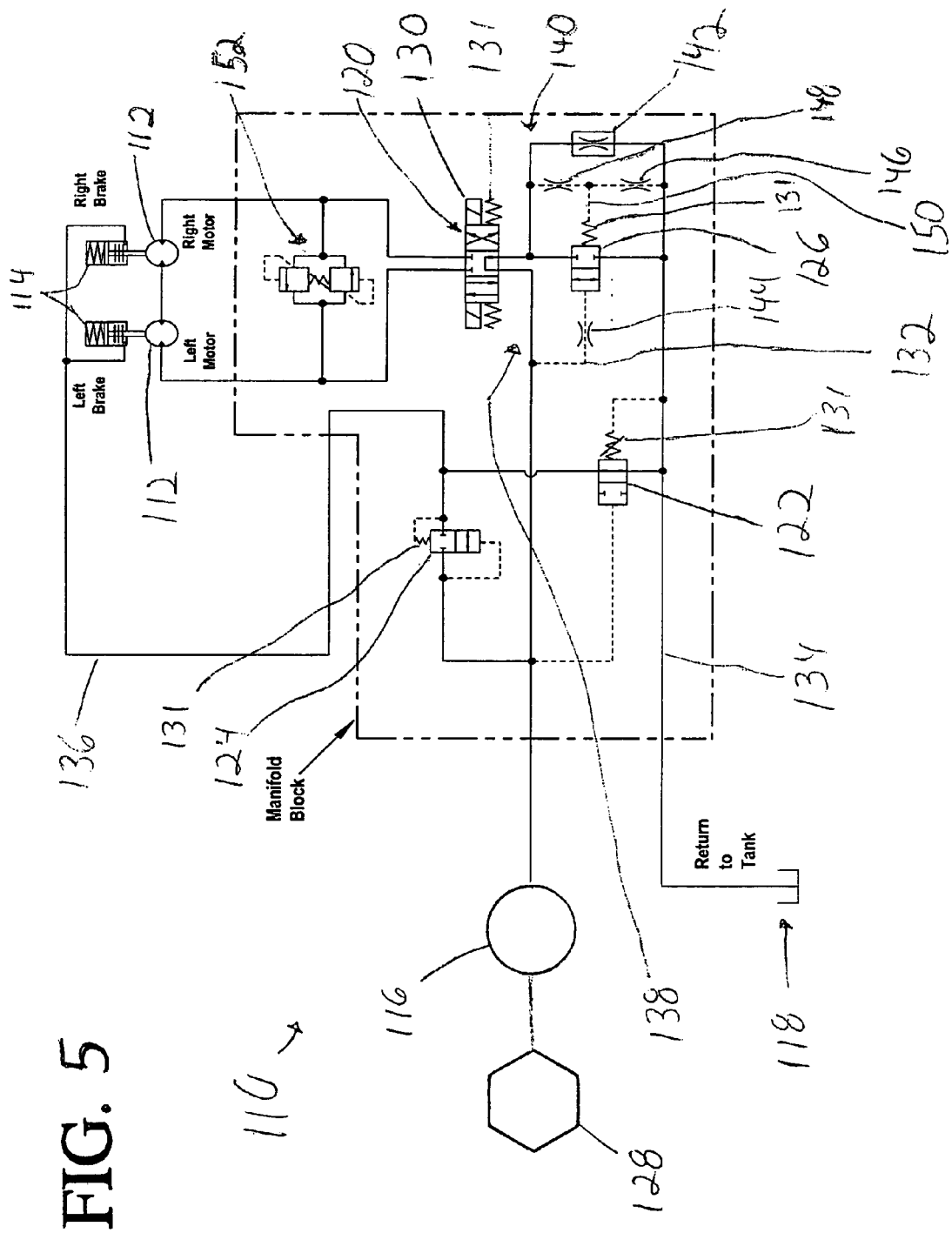
FIG. 5 is a schematic view of a second embodiment of a hydraulic control system and circuit in accordance with the present invention.

Referring now generally to FIG. 5, a second embodiment of a hydraulic control system is schematically shown generally by the numeral 110. The hydraulic control system (110), which can also be described as a hydraulic power system (110) or a hydraulic drive system (110), is for a wheeled vehicle. The hydraulic control system (110) can operate at least one hydraulic motor (112) and at least one hydraulic brake (114). The motor (112) is operable at a motor activation pressure; the brake (114) is disengaged at a brake deactivation pressure, and a pump (116) supplies fluid at a fluid pressure.

The hydraulic control system (110) further includes a reservoir tank (118), a directional control valve (120), a low limit valve (122), a one-way valve (124), and a return valve (126). The pump (116), user control device (128), and directional control valve (20) are embodied and can operate substantially as described above. For example, the directional control valve (120) can include solenoids (130), springs (131), or a combination of both, that are responsive to the user control device (128) to facilitate the directional flow of the hydraulic fluid around the hydraulic motor (112) and through the hydraulic control system (110).

Additionally, directional control valve (120) can be used to stop the vehicle. This can occur when the user control device (128) is returned to a neutral position, which removes power to the pump (116). When the pump (116) stops, the directional control valve (120) returns to its neutral position via the internal centering springs (131), thereby blocking fluid flow to and from the motor (112). By blocking fluid flow from the motor (112) to the return tank (118), the vehicle is effectively stopped via "hydraulic dynamic braking". The motor (112) cannot rotate unless there is an open passage allowing fluid flow away from the motor (112), and preferably back to the tank (118).

This feature is an improvement over conventional systems. For example, conventional systems require the brakes to be sized to provide sufficient force to dynamically stop the vehicle. However, by employing hydraulic dynamic braking via the directional control valve (120), there is no longer the need to have such large-sized brakes (114). In effect, the brakes (114) can become just parking brakes and can be much smaller. Also, because the brakes (114) are primarily static brakes, heat will not be generated and the brakes (114) will last longer as compared to brakes in conventional systems. However, the brakes (114) are still available to stop the vehicle in an emergency. Therefore, the dual braking system makes the vehicle operation safer.

The hydraulic control system (110) includes a first hydraulic sub-circuit (138) connecting the pump (116) to the motor (112) to provide a motor input pressure at the fluid input on the motor (112). The first hydraulic sub-circuit (138) further comprises a one-way valve (124) connected between the pump (116) and the brake (114) and a low limit valve (122) connected between the reservoir tank (118) and the brake (114).

The low limit valve (122) restricts fluid flow from the brake (114) to the reservoir tank (118) after an initial pressure is reached, while the one-way valve (124) restricts fluid flow from the brake (114) to the pump (116). Preferably, the initial pressure is less than the brake deactivation pressure, wherein operation of the hydraulic control system (110) restricts fluid flow from the brake (114) after the initial pressure is reached. Alternately stated, the low limit valve (122) and the one-way valve (124) block fluid flow from the brake (114) when the fluid pressure is greater than the initial pressure. The one-way valve (124) can be a check valve.

The hydraulic control system (110) further includes a second hydraulic sub-circuit (140) connecting the fluid output on the motor (112) to the reservoir tank (118). The second hydraulic sub-circuit (140) further comprises a return valve (126) connected between the fluid output on the motor (112) and the tank (118). The return valve (126) includes a return valve control input (132), and can be a normally closed proportional valve.

The return valve control input (132) is connected to the first hydraulic sub-circuit (138) to receive a return valve control signal having a magnitude that is proportional to the motor input pressure. The return valve (126) is responsive to the return valve control signal to restrict fluid flow from the fluid output on the motor (112) when the motor input pressure is below a set pressure level, and to enable unrestricted fluid flow from the fluid output on the motor (112) when the motor input pressure is above the set pressure level.

The set pressure level is selected such that the return valve (126) will maintain a positive pressure at the fluid input on the motor (112) that is sufficient to inhibit free rotation of the motor (112) and vehicle wheel when the vehicle is being operated on an inclined surface. Additionally, the set pressure level is selected such that the return valve (126) will maintain a positive pressure at the fluid input on the motor (112) that is sufficient dampen variation in the motor input pressure. The variation in the motor input pressure can include episodic variations or periodic variations. For example, the pressure variations can be caused by cogging of the motor, where cogging can be defined as pressure drops in a motor caused by the physical geometry of the motor components.

The second hydraulic sub-circuit (140) further comprises a bypass return valve (142) connected between the fluid output on the motor (112) and the tank (118). The second hydraulic sub-circuit (140) is positioned fluidly parallel to the return valve (126), wherein the bypass return valve (142) maintains a minimum fluid flow independent of the operation of the return valve (126). The bypass return valve (142), which can also be described as a pressure compensated control valve, allows a minimum fluid flow to pass around the return valve (126) and continue along the hydraulic return line (134) to the tank (118). However, the bypass return valve (142) has a maximum flow limit. Therefore, when the return valve (126) is closed, the bypass return valve (142) restricts the motor (112) to a maximum operation level proportional to the maximum flow limit. This maximum operational level of the motor in turn results in a maximum speed for the wheeled vehicle when the return valve (126) is closed. Since the return valve (126) is closed at low system pressures, which results in low vehicle speeds, the vehicle will have a minimum speed, which can be called a "creep" or "pulse" speed, based upon the fluid flow allowed through the bypass return valve (142).

Additionally, this fluid flow through the bypass return valve (142) reduces the strain on the hydraulic control system (110) at transition periods. For example, the fluid flow allowed through the bypass return valve (142) reduces the strain on the hydraulic control system (110) when the vehicle transitions from an inclined surface to a substantially flat surface. For example, as a downward moving vehicle that uses a conventional control system reaches the tangent point between a ramp and level ground, high system pressure would suddenly decompress, as the gravity induced pressure load is eliminated. This rapid decompression would produce a loud, damaging noise, such as a bang. The controlled flow through the bypass return valve (142) substantially prevents this from occurring and the transition from a ramp to flat ground is smoother.

As previously mentioned, the return valve control signal can include a magnitude that is proportional to the motor input pressure. The motor input pressure can be processed or filtered to obtain a desired range of return valve control signals for a particular operation of the hydraulic control system (110). Specifically, the second hydraulic sub-circuit (140) can comprise a first restriction valve (144) positioned along the return valve control input (132) to control the return valve control signal.

A second restriction valve (146) and a third restriction valve (148) can be positioned along a closing input (150) of the return valve (126). The second and third restriction valves (146 and 148), which can alternately be called fluid orifices, can control a closing signal received by the return valve (126) through the closing input (150) that can be connected to the second hydraulic sub-circuit (140). Preferably, the second restriction valve (146) is fluidly parallel to the third restriction valve (148)

The first restriction valve (144), which can alternately be called a fluid orifice, can limit the magnitude of the return valve control signal and dampen the effect of pressure variances in the motor input pressure. This control by the first, second and third restriction valves (144, 146, and 148) can reduce unwanted movement in the return valve (126), including closures and openings, which in turn reduces unwanted fluctuations in the operation of the motor (112), which in turn reduces unwanted fluctuations in the movement of the wheeled vehicle.

The implications of the return valve (126), the bypass return valve (142), and the first, second and third restriction valves (144, 146, and 148) can be seen when the vehicle is on an inclined surface. In this situation, the brake (114) would be disengaged when the system pressure is above the brake disengagement pressure, which can be described as brake release pressure. However, the system pressure will reduce as the motor (112) tries to overrun the fluid supply from the pump (116) due to the effects of gravity. At the set pressure level, which is preferably greater than the brake release pressure, the return valve (126) closes. The bypass return valve (142) allows a restrictive, pressure-compensated flow path around the return valve (126). This reduces the vehicle to a slowed predetermined minimum "creep" speed, independent of load changes due, in part, to vehicle weight or ramp angle, etc.

A further small movement of the user control device (128), increases fluid flow and system pressure at the first restriction valve (144). This results in a controlled opening of the return valve (126) in a gradual manner. Opening of the return valve (126) provides a larger flow path back to the tank (118) from the motor (112). The ramp descent speed of the vehicle increases, but at a controlled rate, for example, without the "run-away" effect.

Additionally, a pressure drop is generated between second and third restriction valves (146 and 148). The resultant pressure level between second and third restriction valves (146 and 148) is maintained at a lower value than the resultant pressure level between the return valve (126) and the directional control valve (120). This lower pressure level facilitates keeping the return valve (126) stable and prevents oscillating, particularly while descending a ramp.

Additionally, a dual overload relief valve (152) is included. This valve connects the flow input and outputs of the motor (112) and limits the amount of pressure that can be developed during dynamic braking. The valve (152) also softens hard braking action on flat ground. The dual overload relief valve (152) equalizes pressure differences between the flow input and outputs of the motor (112) when the directional control valve (120) is closed.

As shown in each of the drawing figures, all of the hydraulic circuit components, excluding the pump, tank, motors, and brakes, can be mounted in a unitary manifold block.

METHOD OF OPERATION

The present invention includes a method of using a single pump to control the operation of at least one hydraulic motor and at least one hydraulic brake. The method comprises positioning the hydraulic motor and hydraulic brake in separate hydraulic fluid lines and then restricting the flow of hydraulic fluid to the hydraulic motor until the hydraulic brake disengages.

Additionally, the method includes maintaining an amount of hydraulic fluid within the hydraulic motor to restrict free movement of the hydraulic motor when a load is placed on the hydraulic motor. Alternatively described, the method includes maintaining a level of hydraulic pressure within the hydraulic motor to maintain a static load supported by the hydraulic motor.

The method includes pressurizing the hydraulic motor before the hydraulic brake disengages. This initial pressure position preferably does not activate the hydraulic motor, but only primes or readies the hydraulic motor.

Also disclosed is a method of controlling fluid flow in a hydraulic circuit between a pump, hydraulic brake and a hydraulic motor, the hydraulic circuit driving a wheeled vehicle. The method comprises the steps of restricting the fluid flow from the pump to the motor after an initial pressure is reached and allowing fluid flow from the pump to the motor after a motor activation pressure is reached.

This method further includes allowing fluid flow from the pump to the motor after a brake deactivation pressure is reached, wherein the brake deactivation pressure is greater than the motor activation pressure. Additionally, the method further comprises placing the brake and motor in independent hydraulic sub-circuits. Variations in a motor input pressure of the motor are dampened by sensing the variations in motor input pressure, providing a valve control signal that is responsive to the sensed variations in motor input pressure and using the valve control signal to variably restrict flow of fluid from a fluid output from the motor when the motor input pressure is below a set pressure level and to enable flow of fluid from the fluid output of the motor when the motor input pressure is above the set pressure level. Additionally, the set pressure level is set such that the variations in the motor input pressure are dampened and free rotation of the motor is inhibited when the vehicle is operated on an inclined surface. Also, the method teaches maintaining a minimum flow of fluid from a fluid output of the motor when the motor is activated.

Thus, although there have been described particular embodiments of the present invention of a new and useful Hydraulic Motor and Brake Control System and Method of Controlling the Same, it is not intended that such references be construed as limitations upon the scope of this invention except as set forth in the following claims.

What is claimed is:

1. A hydraulic drive system for a wheeled vehicle comprising:
   a hydraulic motor operably connected to at least one vehicle wheel, the hydraulic motor having a fluid input and a fluid output and operable at a motor activation pressure;
   a hydraulic pump supplying fluid at a fluid pressure;
   a reservoir tank fluidly connected to the pump to supply fluid to the pump;
   a first hydraulic sub-circuit connecting the pump to the motor to provide a motor input pressure at the fluid input on the motor;
   a hydraulic brake operably engaging the motor and operable at a brake deactivation pressure;
   a brake sub-circuit connecting the pump to the brake;
   the first hydraulic sub-circuit further comprising a high limit valve connected between the pump and the motor and a low limit valve connected fluidly parallel to the high limit valve and between the pump and the motor wherein:
      the low limit valve restricts fluid flow to the motor after an initial pressure is reached;
      the high limit valve restricts fluid flow to the motor until the brake deactivation pressure is reached; and
      the initial pressure is less than the brake deactivation pressure; and
   wherein operation of the hydraulic drive system restricts the rotation of the motor until the brake is operably disengaged from the motor.

2. The hydraulic drive system of claim 1 wherein the motor activation pressure is greater than the initial pressure and less than the brake deactivation pressure.

3. The hydraulic drive system of claim 1 wherein the brake sub-circuit is an open circuit from the pump to the brake.

4. The hydraulic drive system of claim 1 wherein the low limit valve and the high limit valve restrict fluid flow to the motor when the fluid pressure is between the brake deactivation pressure and the initial pressure.

5. A method of controlling fluid flow in a hydraulic circuit between a pump, hydraulic brake and a hydraulic motor, the hydraulic circuit driving a wheeled vehicle, the method comprising the steps of:
   a) restricting the fluid flow from the pump to the motor after an initial pressure is reached;
   b) restricting fluid flow from the pump to the motor until a motor activation pressure is reached; and
   c) restricting fluid flow from the pump to the motor until a brake deactivation pressure is reached.

6. The method of claim 5 wherein step b) further includes allowing fluid flow from the pump to the motor after a brake deactivation pressure is reached, wherein the brake deactivation pressure is greater than the motor activation pressure.

7. The method of claim 5 further comprising the step of:
   c) allowing unrestricted fluid flow from the pump to the brake at all pressures.

8. The method of claim 7 further comprising the step of:
   d) placing the brake and motor in independent hydraulic sub-circuits.

9. A method of controlling fluid flow in a hydraulic circuit between a pump, hydraulic brake and a hydraulic motor, the hydraulic circuit driving a wheeled vehicle, the method comprising the steps of:
   a) restricting the fluid flow from the pump to the motor after an initial pressure is reached;
   b) allowing fluid flow from the pump to the motor after a motor activation pressure is reached; and
   c) dampening variations in a motor input pressure of the motor by:
      1) sensing the variations in motor input pressure;
      2) providing a valve control signal that is responsive to the sensed variations in motor input pressure;
      3) using the valve control signal to variably restrict flow of fluid from a fluid output from the motor when the motor input pressure is below a set pressure level and to enable flow of fluid from the fluid output of the motor when the motor input pressure is above the set pressure level; and
      4) setting the set pressure level such that the variations in the motor input pressure are dampened.

10. The method of claim 9 further comprising the step of:
    d) selecting the set pressure level such that free rotation of the motor is inhibited when the vehicle is operated on an inclined surface.

* * * * *